United States Patent [19]

Bell

[11] Patent Number: 4,645,809

[45] Date of Patent: Feb. 24, 1987

[54] DIRECT METHOD FOR PREPARING SYNDIOTACTIC 1,2-POLYBUTADIENE

[75] Inventor: Anthony J. Bell, Stow, Ohio

[73] Assignee: The Goodyear Tire & Rubber Company, Akron, Ohio

[21] Appl. No.: 821,583

[22] Filed: Jan. 23, 1986

[51] Int. Cl.$^4$ .................................................. C08F 4/70
[52] U.S. Cl. ...................................... 526/140; 526/92
[58] Field of Search .................................. 526/92, 140

[56] References Cited

U.S. PATENT DOCUMENTS

| | | | |
|---|---|---|---|
| 4,051,308 | 9/1977 | Halasa | 526/140 |
| 4,501,867 | 2/1985 | Ueno | 526/92 |

*Primary Examiner*—Paul R. Michl
*Attorney, Agent, or Firm*—Alvin T. Rockhill

[57] ABSTRACT

Short fibers of syndiotactic 1,2-polybutadiene are utilized in making tires that have improved resistance against heat build-up and improved wear characteristics. The preparation of syndiotactic 1,2-polybutadiene in fibrous form has traditionally involved an extrusion and stretching step. However, the technique of the present invention circumvents the necessity of hot mill flexing and/or extrusion in making fibrous syndiotactic 1,2-polybutadiene. The present invention more specifically involves a process for preparing syndiotactic 1,2-polybutadiene fibers directly comprising polymerizing 1,3-butadiene monomer in the presence of (1) a catalyst composition which is comprised of (a) a cobalt compound and (b) an organoaluminum compound; (2) carbon disulfide; and (3) at least one member selected from the group consisting of liquid polymers and naphthenic oils.

32 Claims, No Drawings

DIRECT METHOD FOR PREPARING SYNDIOTACTIC 1,2-POLYBUTADIENE

BACKGROUND OF THE INVENTION

Syndiotactic 1,2-polybutadiene fibers can be utilized as a tread base rubber in tires in order to improve their heat build-up and wear characteristics. However, in order for the syndiotactic 1,2-polybutadiene to provide the desired combination of properties, it is essential for it to be in fibrous form. For example, U.S. Pat. No. 4,274,462 discloses pneumatic tires having improved resistance against heat build-up which employ syndiotactic 1,2-polybutadiene fibers in their tread base rubber.

Various techniques for synthesizing syndiotactic 1,2-polybutadiene in organic solvents and water are known in the art. For example, U.S. Pat. No. 3,901,868 reveals a process for producing a polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-$\beta$-diketone complex, (ii) cobalt-$\beta$-keto acid ester complex, (iii) cobalt salt of organic carboxylic acid, and (iv) halogenated cobalt-ligand compound complex, and an organoaluminum compound, (b) preparing a catalyst composition by mixing the catalyst component solution with an alcohol, ketone or aldehyde compound and carbon disulfide, (c) providing a polymerization mixture containing desired amounts of 1,3-butadiene, the catalyst composition and an inert organic solvent, and (d) polymerizing 1,3-butadiene at a temperature of $-20°$ C. to $90°$ C.

U.S. Pat. No. 4,429,085 reveals a process for producing polybutadiene composed essentially of syndiotactic 1,2-polybutadiene in an aqueous medium comprising polymerizing 1,3-butadiene in said aqueous medium in the presence of (1) a catalyst composition microencapsulated in a polyene product which contains (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$, wherein R represents a hydrocarbon radical of 1 to 6 carbon atoms; and (2) carbon disulfide.

After the syndiotactic 1,2-polybutadiene is synthesized utilizing a conventional technique, it is necessary to convert it to fibrous form. This is generally done utilizing hot mill flexing and/or extrusion techniques.

SUMMARY OF THE INVENTION

The present invention relates to a technique for synthesizing fibrous syndiotactic 1,2-polybutadiene directly without the necessity of utilizing a hot mill flexing or extrusion step. In other words, by utilizing the technique of this invention, syndiotactic 1,2-polybutadiene fibers can be made directly in the polymerization step. By practicing the process of the present invention, the need to use extrusion or hot mill flexing in order to produce fibrous syndiotactic 1,2-polybutadiene is eliminated.

In practicing the present invention, 1,3-butadiene monomer is polymerized in the presence of a liquid polymer and/or naphthenic oil. The presence of the liquid polymer or naphthenic oil during the polymerization causes the syndiotactic 1,2-polybutadiene formed to be in fibrous form. The process of the present invention can be practiced by simply dissolving a liquid polymer or naphthenic oil in 1,3-butadiene monomer followed by polymerizing the 1,3-butadiene monomer utilizing a conventional technique. In fact, fibrous syndiotactic 1,2-polybutadiene can be synthesized utilizing the technique of the present invention in either water or an inert organic solvent.

The present invention more specifically reveals a process for directly preparing syndiotactic 1,2-polybutadiene fibers comprising polymerizing 1,3-butadiene monomer in the presence of (1) a catalyst composition which is comprised of (a) a cobalt compound and (b) an organoaluminum compound: (2) carbon disulfide: and (3) at least one member selected from the group consisting of liquid polymers and naphthenic oils.

The present invention more specifically relates to a process for directly preparing syndiotactic 1,2-polybutadiene fibers comprising:

(1) preparing a monomer component solution by dissolving at least one member selected from the group consisting of liquid polymers and naphthenic oils in 1,3-butadiene monomer;

(2) preparing a polymerization mixture by mixing said monomer component solution, a catalyst composition which is comprised of (a) a cobalt compound and (b) an organoaluminum compound, and carbon disulfide throughout a liquid medium: and (3) allowing said 1,3-butadiene to polymerize in said polymerization mixture into syndiotactic 1,2-polybutadiene fibers.

DETAILED DESCRIPTION OF THE INVENTION

The catalysts and polymerization conditions utilized in the polymerizations of this invention are the same as those utilized in conventional synthesis techniques for preparing syndiotactic 1,2-polybutadiene, except for the fact that the polymerizations of this invention are conducted in the presence of a liquid polymer and/or naphthenic oil. A conventional synthesis technique for preparing syndiotactic 1,2-polybutadiene in an inert organic solvent is described in U.S. Pat. No. 3,901,868 which is incorporated herein by reference in its entirety. A conventional process for preparing syndiotactic 1,2-polybutadiene in an aqueous medium is described in U.S. Pat. No. 4,429,085, which is incorporated herein by reference in its entirety.

The process of the present invention can be practiced by dissolving the liquid polymer and/or naphthenic oil in the 1,3-butadiene monomer prior to polymerization. In other words, the 1,3-butadiene is mixed with the liquid polymer and/or naphthenic oil prior to charging the 1,3-butadiene into the polymerization medium being utilized (before the 1,3-butadiene comes into contact with the catalyst). In effect, the 1,3-butadiene monomer is charged into the polymerization mixture as a monomer component solution which is prepared by dissolving the liquid polymer and/or naphthenic oil in 1,3-butadiene monomer. The monomer component solutions utilized in the process of the present invention will normally have a ratio of 1,3-butadiene to liquid polymer and/or naphthenic oil of from about 1:100 to 10:1. It is generally preferred for the ratio of monomer to liquid polymer and/or naphthenic oil to be from 1:10 to 4:1 with the most preferred ratio being from 1:4 to 1:1.

The liquid polymers which are utilized in the process of the present invention have molecular weights which are low enough for them to be in the liquid state at standard temperature and pressure (S.T.P.). Normally, such liquid polymers will have molecular weights of from about 1,000 to about 200,000. More commonly, the liquid polymers utilized in practicing the process of this invention will have molecular weights of 2,000 to 10,000. The liquid polymers which are most preferred for utilization in the process of the present invention have molecular weights of 3,000 to 7,000. These liquid polymers will commonly be polydienes (polymers which are comprised of repeat units which are derived from one or more diene monomers). For instance, liquid polybutadiene or liquid polyisoprene can be utilized as the liquid polymer. Liquid polymers which are comprised of repeat units which are derived from one or more diene monomers and one or more vinylaromatic monomers can also be utilized in the process of this invention. For instance, liquid styrene-butadiene rubber can be utilized as the liquid polymer. Polysiloxane can also be used as the liquid polymer. The naphthenic oils that can be used include those commonly used to extend rubber.

The catalysts used in practicing the process of this invention are prepared by dissolving at least one cobalt compound and at least one organoaluminum compound in an inert organic solvent containing at least one polyene monomer dissolved therein. The term "an inert organic solvent" as used herein refers to an organic solvent chemically inert to all of the catalyst components used in the process of the present invention, 1,3-butadiene and the butadiene polymer. Some representative examples of inert organic solvents include aromatic hydrocarbons, aliphatic hydrocarbons, alicyclic hydrocarbons, halogenated aromatic hydrocarbons, and mixtures of two or more of the above-mentioned compounds. The aromatic hydrocarbons may be benzene, toluene, xylenes, ethylbenzene, diethylbenzene or isobutylbenzene; and the aliphatic hydrocarbons may be n-hexane, isohexanes, n-heptane, n-octane, isooctanes, n-decane, 2,2-dimethylbutane, petroleum ether, kerosene, petroleum spirit or petroleum naphtha, and the alicyclic hydrocarbon may be either cyclohexane or methylcyclohexane. The halogenated aromatic hydrocarbon may be chlorobenzene, dichlorobenzenes or trichlorobenzenes.

The cobalt compound usable for the process of the present invention is soluble in an inert organic solvent selected from the group consisting of
i. β-diketone complexes of cobalt:
ii. β-keto acid ester complexes of cobalt;
iii. cobalt salts of organic carboxylic acid having 1 to 25 carbon atoms, and.
iv. complexes of halogenated cobalt compounds of the formula: $CoX_n$
wherein X represents a halogen atom and n represents 2 or 3, with an organic compound selected from the group consisting of tertiary amines, alcohols, tertiary phosphines, ketones and N,N-dialkylamindes.

The β-diketone compound to form a complex with a cobalt atom is of the formula:

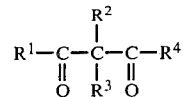

wherein $R^1$ and $R^4$, which are the same as or different from one another, are an alkyl radical of 1 to 6 carbon atoms and $R^2$ and $R^3$, which are the same as or different from one another, are a hydrogen atom or an alkyl radical having 1 to 6 carbon atoms. This type of β-diketone complex of cobalt may be cobalt (II) acetylacetonate or cobalt (III) acetylacetonate.

The β-keto acid ester to form a complex with a cobalt atom may be of the formula:

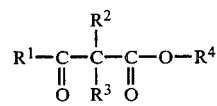

wherein $R^1$, $R^2$, $R^3$ and $R^4$ are the same as defined above. This type of cobalt complex may be a cobalt-acetoacetic acid ethyl ester complex.

The cobalt salt of organic carboxylic acid may be either cobalt octoate or cobalt naphthenate.

In the ligand compounds capable of forming a complex with a halogenated cobalt compound, the tertiary amine may be pyridine, triethylamine, tributylamine or dimethylaniline, the alcohol may be methyl alcohol or ethyl alcohol, the tertiary phosphine may be trimethyl phosphine, tributyl phosphine or triphenyl phosphine, the ketone may be acetone or methyl ethyl ketone and the N,N-dialkylamide may be N,N-dimethylformamide, N,N-dimethylacetamide, N,N-diethylformamide or N,N-diethylacetamide. The complex of halogenated cobalt is preferably either a complex of cobalt chloride with pyridine or ethyl alcohol.

The organoaluminum compound usable for the process of the present invention is of the formula $AlR_3$ wherein R represents a hydrocarbon radical of 1 to 6 carbon atoms. They hydrocarbon radical may be an alkyl, cycloalkyl or aryl radical of 1 to 6 carbon atoms. Preferably, the organoaluminum compound may be trimethylaluminum, triethylaluminum or triphenylaluminum.

In the preparation of the catalyst component solution, it is important that the cobalt compound and the organoaluminum compound are dissolved in the inert organic solvent containing at least one polyene. Some polyenes that can be used in the formation of the polyene products used to prepare microencapsulated catalysts are 1,3-butadiene, 1,3-pentadiene, isoprene, myrcene, and 1,5-cyclooctadiene. Polyenes in which at least two of the double bonds are conjugated and which have minimal substitution on the double bonds are preferred, particularly 1,3-butadiene. Other olefins which can be used are those which are capable of serving as chelating agents for transition metals, such as 1,5-cyclooctadiene. Polyenes with neither conjugation nor good chelating potential are much less effective. If the preparation is carried out in the absence of a polyene, the resultant catalyst component solution is not effective as a component of the catalyst composition of the present invention. The polyene is preferably used in a ratio by mole of at least 1.0, more preferably, at least 5.0 to the amount by mole of the cobalt compound to be used in the catalyst component solution. The preferred polyenes for use in this invention are 1,3-butadiene, 1,3-pentadiene, isoprene, and myrcene. The most preferred polyene is 1,3-butadiene.

Generally, the larger the ratio of the amount of polyene to the cobalt compound in the catalyst component solution, the higher the activity of the catalyst. However, the activity of the catalyst reaches a maximum value at a ratio by mole of polyene monomer to the cobalt compound used in the catalyst component solution of between 10 and 200. For example, if a molar ratio of polyene monomer to the cobalt compound of 10,000 is employed the activity of the catalyst will be similar to that of the catalyst prepared from a catalyst component solution containing a ratio of polyene monomer to the cobalt compound of from 10 to 200. If the ratio is less than 1.0, the resultant catalyst composition has poor activity.

The catalyst component solution is preferably prepared at a temperature of 10° to 50° C. and preferably contains 0.0005 to 1.0% by mole, more preferably 0.001 to 0.5% by mole, of the cobalt compound. 0.001 to 10% by mole, more preferably, 0.03 to 5% by mole of the organoaluminum compound based on the amount by mole of 1,3-butadiene to be polymerized. The ratio by mole of the organoaluminum compound to the cobalt compound is preferably in a range from 0.5 to 50, more preferably, from 0.2 to 10.

In the preparation of the catalyst component solution it is preferred for the cobalt compound to be first dissolved in the inert organic solvent in the presence of the polyene monomer and then for the organoaluminum compound to be added to the solution. However, very satisfactory results can also be obtained when the organoaluminum compound is added first.

In the preparation of this catalyst component solution the organoaluminum compound should not be allowed to come in contact with water. This is because water can completely decompose such organoaluminum compounds. Accordingly, it is preferable that the inert organic solvent to be used to prepare the catalyst component solution be preliminarily dehydrated at least up to a content of water which is insufficient to completely decompose the entire amount of the organoaluminum compound.

It is preferable that the catalyst component solution be prepared using a dehydrated inert organic solvent. However, a trace of water in the inert organic solvent can be present up to a concentration of about 500 ppm (parts per million by weight). In fact, it is believed that the total elimination of water from such a catalyst component solution is undesirable. It is preferred for no more than 200 ppm of water to be present in the inert organic solvent used in the preparation of the catalyst component solution. If the content of water in the inert organic solvent is larger than 500 ppm, the catalyst component solution has to contain a relatively large amount of the cobalt compound and organoaluminum compound. This results in an economic disadvantage. If a sufficient amount of water is present in the inert organic solvent used in the preparation of the catalyst component solution the catalyst can be completely destroyed.

It is desirable to allow the prereaction used in the preparation of the catalyst component solution to run for a period of at least 30 seconds, and more preferably for at least 1 minute before mixing the catalyst component solution with the 1,3-butadiene/water mixture to form the reaction mixture. Longer time periods can be used without the catalyst component solution losing its activity.

After the organoaluminum compound has been incorporated in the catalyst component solution using the above-described technique the catalyst is "protected" from decomposition by water. This is believed to be due to a microencapsulation of the catalyst by polyene product formed in the prereaction process used in the preparation of the catalyst component solution.

It is believed that a hydrophobic shield is formed around the catalyst that water cannot readily penetrate; however, this hydrophobic shield or membrane is probably permeable by the butadiene monomer being polymerized into the syndiotactic 1,2-polybutadiene. When 1,3-butadiene is used as the polyene, the butadiene product which microencapsulates the catalyst is believed to be a butadiene monomer complex, an oligomerized butadiene or a polymer of butadiene. It has been determined that this protection is sufficient to allow for the use of this catalyst component solution in an aqueous suspension polymerization of butadiene into 1,3-polybutadiene of syndiotactic crystallinity. The microencapsulated catalyst formed can, of course, also be used to catalyze the polymerization of 1,3-butadiene monomer in inert organic mediums.

A reaction mixture can be prepared by mixing a catalyst component solution with a monomer component solution. Normally, the monomer component solution will be diluted in a liquid medium. The liquid medium can be an inert organic solvent or water. It is also possible to utilize a liquid polymer and/or naphthenic oil as the liquid medium. The reaction mixture prepared can contain from as little as about 2% 1,3-butadiene to as much as about 50% 1,3-butadiene by weight based upon the total weight of the reaction mixture. It is preferred for the reaction mixture to contain from 15% to 35% by weight butadiene, and it is more preferred for it to contain 20% to 25% butadiene by weight. Since 1,3-butadiene is very volatile, it will be necessary to prepare this mixture in a closed system. Agitation should be provided in the preparation of the reaction mixture in order to insure that the catalyst component solution and 1,3-butadiene are distributed essentially homogeneously throughout the mixture. Since 1,3-butadiene is essentially insoluble in water it will be present in aqueous systems in the form of droplets which are distributed throughout the mixture. If agitation is discontinued there will be a separation of the organic and aqueous components in such aqueous mixtures into two layers. The organic and aqueous layers of such aqueous reaction mixtures can be mixed together again by agitating the reaction mixture.

A polymerization mixture can be prepared by mixing carbon disulfide throughout the above-described reaction mixture. The amount of carbon disulfide that can be added will vary between 0.005 mole percent and 2 mole percent based on the amount of moles of 1,3-butadiene to be polymerized in the polymerization mixture. More preferably the amount of carbon disulfide added will vary between 0.001 and 1 mole percent based on the amount of moles of 1,3-butadiene to be polymerized in the polymerization mixture.

In the process of the present invention, the larger the proportion of the carbon disulfide in a range from about 0.0005 to about 0.5% by mole based on the amount by mole of the 1,3-butadiene to be polymerized in the polymerization mixture, the larger the yield of the polymer product obtained from the polymerization mixture. However, too large an amount of carbon disulfide, for example, larger than 0.5% by mole, causes a decrease in the polymer yield.

In the process of the present invention the crystallinity and melting point of the polybutadiene produced can be controlled by adding alcohols, ketones, nitriles, aldehydes, or amides to the polymerization mixture. In this aqueous suspension polymerization process there is a limitation of controlling crystallinity and melting point with agents which are water-soluble. Thus ethanol and methanol are not as effective as other alcohols which are much less soluble in water than in hydrocarbons. Water soluble agents can not be used effectively to control crystallinity and melting point (only hydrocarbon soluble agents can be used). A detailed description of the agents and techniques that are used to control crystallinity and melting points is given in U.S. Pat. Nos. 3,901,868 and 4,153,767. These patents are incorporated herein by reference in their entirety. As has been pointed out, water soluble agents, such as ethanol and methanol, are not effective agents. Other alcohols such as, 2-ethyl-1-hexanol, 1-decanol, and 5-tridecanol, which are not soluble in water, have been used very successfully.

In the final step of this process the 1,3-butadiene monomer in the polymerization mixture is converted into polybutadiene while agitating the polymerization mixture. If the use of an antioxidant is desired, it may be added conveniently at the beginning of the polymerization. This polymerization of 1,3-butadiene monomer can be carried out at a temperature from about $-20°$ C. to about 90° C. It is preferable for the polymerization temperature to be from 0° C. to 40° C. The most preferred polymerization temperature is about 10° C. At temperatures below 0° C. an antifreeze agent can be added to the polymerization mixture to keep it from freezing.

This polymerization can be carried out either under a normal pressure or in a pressurized system. This polymerization can be carried out under a nitrogen atmosphere with good results. Such a polymerization can be run for a period of from about 1 to about 30 hours. It is generally preferred for the polymerization to be run for about 10 hours. However, the optimum polymerization time will vary greatly with the polymerization temperature, catalyst, the amount of catalyst used, etc. The polybutadiene formed using the process of this invention will float to the surface of the polymerization mixture and can easily be recovered.

Various embodiments of the process of the present invention in practice are illustrated by the following working examples. These examples are intended merely to illustrate the present invention and not in any sense to limit the scope in which the present invention can be practiced. Unless specifically indicated otherwise, parts and percentages are given by weight.

EXAMPLE 1

A typical non-aqueous polymerization utilizing the process of this invention was carried out by charging 35 grams of liquid polybutadiene having a molecular weight of about 5,000, 0.25 grams of 2,6-di-t-butyl-p-cresol, and 25 grams (after venting) of 1,3-butadiene monomer into an 8-ounce (227 gram) polymerization bottle. The bottle was capped with a self-seal lined cap and tumbled in a constant temperature bath maintained at 10° C. for about 1 hour. The liquid polymer dissolved into the 1,3-butadiene monomer. This polymerization was initiated by charging cobalt octanoate, triethyl aluminum and carbon disulfide into the polymerization bottle. This was done by charging 1.5 ml. of a 0.08 M (molar) solution of cobalt octanoate and triethyl aluminum having a molar ratio of aluminum to cobalt of 4:1 into the bottle followed by charging 0.6 ml. of a 0.2 M solution of carbon disulfide into it. The polymerization bottle was allowed to remain in the constant temperature bath for a period of 18 hours, during which time the polymerization mixture had set up.

A yield of 60 grams of a semi-transparent hard rubber-like blend was obtained which consisted of the syndiotactic 1,2-polybutadiene embedded in a liquid polymer matrix. The syndiotactic 1,2-polybutadiene rubber particles formed could not be observed by the naked eye, but extraction of the liquid polybutadiene with toluene from a weighed sample of the blend gave the theoretical amount of syndiotactic 1,2-polybutadiene having a melting point of 190° C. Microscopy studies at 30,000 magnification showed that the syndiotactic 1,2-polybutadiene produced to be in the form of fibers. These fibers were determined to have diameters of about 100 Å (angstroms) and lengths in the range of about 700 to 1,700 Å.

It should be noted that in the liquid polybutadiene/syndiotactic 1,2-polybutadiene matrices formed, no free liquid polymer was found. This proved to be the case even when the ratio of liquid polybutadiene to 1,3-butadiene monomer charged is as high as 2:1. Additionally, such blends did not have an "oil-like feel." This example clearly shows that syndiotactic 1,2-polybutadiene can be produced in fibrous form directly eliminating the need for a separate extrusion or stretching step.

EXAMPLE 2

The procedure specified in Example 1 was repeated in this experiment except that 40 grams of silicon oil was substituted for the 35 grams of liquid polybutadiene utilized in Example 1. An additional difference between the two procedures is that in this Example, the polymerization was allowed to continue for about 20 hours. The rubber blend produced in this experiment was washed with isopropanol and dried. A 59 gram yield of an opaque flexible material was obtained. It was determined by microscopy that the syndiotactic 1,2-polybutadiene produced in this experiment was in fibrous form.

EXAMPLE 3

In this Example, syndiotactic 1,2-polybutadiene fibers were synthesized in an aqueous medium. This was done by charging 35 grams of liquid polybutadiene, 0.25 grams of 2,6-di-t-butyl-p-cresol, 30 ml. of distilled water, and 25 grams of 1,3-butadiene monomer into an 8-ounce (227 gram) polymerization bottle. The polymerization bottle was then tumbled in a constant temperature bath for 90 minutes at a temperature of 10° C. The mixture in the polymerization bottle was then treated with the co-catalysts specified in Example 1. The 1,3-butadiene monomer was allowed to polymerize for about 20 hours. The polymer blend produced fell out of the polymerization bottle as a large solid mass rather than as suspended particles. Isolation and drying of the rubber blend yielded 57 grams of product. A sample of the syndiotactic 1,2-polybutadiene was studied by microscopy. It was again determined that the syndiotactic 1,2-polybutadiene produced was in fibrous form.

These examples clearly show that by utilizing the technique of the present invention, syndiotactic 1,2-polybutadiene fibers can be produced directly during polymerization.

While certain representative embodiments and details have been shown for the purpose of illustrating the invention, it will be apparent to those skilled in this art that various changes and modifications can be made therein without departing from the scope of this invention.

What is claimed is:

1. A process for directly preparing syndiotactic 1,2-polybutadiene fibers comprising:
   (1) preparing a monomer component solution by dissolving at least one member selected from the group consisting of liquid polymers and naphthenic oils in 1,3-butadiene monomer:
   (2) preparing a polymerization mixture by mixing said monomer component solution, a catalyst composition which is comprised of (a) a cobalt compound and (b) an organoaluminum compound, and carbon disulfide throughout a liquid medium: and
   (3) allowing said 1,3-butadiene to polymerize in said polymerization mixture into syndiotactic 1,2-polybutadiene fibers.

2. A process as specified in claim 1 wherein said liquid medium is water and wherein said catalyst composition is microencapsulated in a polyene product.

3. A process as specified in claim 2 wherein said member selected from the group consisting of liquid polvmers and naphthenic oils is a liquid polymer.

4. A process as specified in claim 1 wherein said liquid medium is water and wherein said catalyst composition is in a solution which is prepared by dissolving in an inert organic solvent containing at least one polyene (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms.

5. A process as specified in claim 1 wherein the ratio of 1,3-butadiene monomer to said members selected from the group consisting of liquid polymers and naphthenic oils in said monomer component solution is from 1:100 to 10:1.

6. A process as specified in claim 3 wherein said liquid polymer is a liquid polydiene.

7. A process as specified in claim 3 wherein said liquid polydiene has a molecular weight of from 1,000 to 200,000.

8. A process as specified in claim 7 wherein said liquid polydiene is liquid polybutadiene having a molecule weight of 2,000 to 10,000.

9. A process as specified in claim 1 wherein said member selected from the group consisting of liquid polymers and naphthenic oils is liquid polysiloxane.

10. A process as specified in claim 6 wherein said liquid polydiene is selected from the group consisting of liquid polybutadiene and liquid polyisoprene.

11. A process for directly preparing syndiotactic 1,2-polybutadiene fibers comprising:
    (1) preparing a monomer component solution by dissolving at least one member selected from the group consisting of liquid polymers and naphthenic oils in 1,3-butadiene monomer;
    (2) preparing a catalyst solution by dissolving, in an inert organic solvent containing 1,3-butadiene, (a) at least one cobalt compound selected from the group consisting of (i) $\beta$-diketone complexes of cobalt, (ii) $\beta$-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$ wherein R represents a hydrocarbon radical of 1 to 6 carbon atoms;
    (3) preparing a reaction mixture by mixing said monomer component solution with said catalyst component solution in a liquid medium:
    (4) preparing a polymerization mixture by mixing carbon disulfide throughout said reaction mixture: and
    (5) polymerizing said 1,3-butadiene monomer in said polymerization mixture into syndiotactic 1,2-polybutadiene fibers at a temperature between about $-20°$ C. and about $90°$ C. while agitating said polymerization mixture.

12. A process as specified in claim 11 wherein said liquid medium is water and wherein said member selected from the group consisting of liquid polymers and naphthenic oils is a liquid polymer having a molecular weight of 2,000 to 10,000.

13. A process as specified in claim 12 wherein said temperature is between $0°$ C. and $40°$ C.;
    wherein said inert organic solvent is selected from the group consisting of aromatic hydrocarbons, aliphatic hydrocarbons, alicyclic hydrocarbons, halogenated aromatic hydrocarbons, and mixtures of two or more of the above-mentioned compounds:
    wherein said catalyst component solution is prepared by first dissolving said cobalt compound into said inert organic solvent containing 1,3-butadiene and secondly, dissolving said organoaluminum compound into said inert organic solvent containing said 1,3-butadiene and said cobalt compound;
    wherein said catalyst component solution contains 0.0005 to 1.0% by mole of said cobalt compound and 0.001 to 10% by mole of said organoaluminum compound, based on the amount by mole of said 1,3-butadiene to be polymerized in said polymerization mixture:
    wherein said polymerization mixture contains from 0.005 to 2 mole percent carbon disulfide, based on the amount by mole of said 1,3-butadiene to be polymerized in said polymerization mixture;
    wherein said catalyst component solution is prepared at a temperature of $10°$ C. to $50°$ C.;

wherein the ratio by mole of the amount of said organoaluminum compound to said cobalt compound is in the range from 0.5 to 50; and wherein the reaction mixture contains from about 2% to about 50% 1,3-butadiene monomer, based upon the total weight of the reaction mixture.

14. A process as specified in claim 13 wherein said inert organic solvent contains at 50 ppm of water, based upon the weight of said inert organic solvent:

wherein said polymerization mixture contains from 0.001 to 1 mole percent carbon disulfide, based on the amount by mole of said 1,3-butadiene to be polymerized in said polymerization mixture:

wherein said catalyst component solution contains 0.001 to 0.5% by mole of said cobalt compound and 0.03 to 5% by mole of said organoaluminum compound, based on the amount by mole of said 1,3-butadiene to be polymerized in said polymerization mixture: and wherein the reaction mixture contains from 15% to 35% 1,3-butadiene monomer by weight.

15. A process as specified in claim 14 wherein said cobalt compound is selected from the group consisting of cobalt octoate and cobalt naphthenate; and wherein said organoaluminum compound is selected from the group consisting of trimethylaluminum, triethylaluminum, tributylaluminum and triphenylaluminum.

16. A process as specified in claim 2 wherein said polyene product is a product of at least one polyene selected from the group consisting of 1,3-butadiene, 1,3-pentadiene, isoprene and myrcene.

17. A process as specified in claim 6 wherein said liquid polydiene has a molecular weight of 2,000 to 10,000 and wherein said polymerization is carried out at a temperature between about −20° C. and about 90° C.

18. A process as specified in claim 17 wherein said liquiod polydiene has a molecular weight of 3,000 to 7,000 and wherein said polymerization is carried out at a temperature between 0° C. and 40° C.

19. A process as specified in claim 11 wherein said syndiotactic 1,2-polybutadiene fibers have a diameter of about 100 Å and lengths in the range of about 700 Å to 1,700 Å.

20. A process as specified in claim 15 wherein said liquid polyemr is a liquid polydiene.

21. A process as specified in claim 20 wherein said liquid polydiene is selected from the group consisting of liquid polybutadiene and liquid polyisoprene.

22. A process as specified in claim 15 wherein said liquid polymer is liquid polybutadiene.

23. A process as specified in claim 22 wherein said liquid polybutadiene has a molecular weight of 3,000 to 7,000.

24. A process as specified in claim 5 wherein said member selected from the group consisting of liquid polymers and naphthenic oils is a liquid polydiene having a molecular weight of 2,000 to 10,000; and wherein said polymerization is carried out at a temperature between about −20° C. and about 90° C.

25. A process as specified in claim 17 wherein the ratio of 1,3-butadiene monomer to said liquid polydiene in the monomer component solution is within the range of 1:10 to 4:1.

26. A process as specified in claim 2 wherein the ratio of 1,3-butadiene monomer to said members selected from the group consisting of liquid polymers and naphthenic oils in said monomer component solution is from 1:4 to 1:1.

27. A process as specified in claim 11 wherein the ratio of 1,3-butadiene monomer to said members selected from the group consisting of liquid polymers and naphthenic oils in said monomer component solution is from 1:10 to 4:1.

28. A process as specified in claim 1 wherein said polymerization is carried out at a temperature between about −20° C. and about 90° C.; and wherein the ratio of 1,3-butadiene monomer to said members selected from the group consisting of liquid polymers and naphthenic oils in said monomer component solution is from 1:4 to 1:1.

29. A process as specified in claim 20 wherein said liquid polydiene is liquid polybutadiene.

30. A process as specified in claim 11, wherein the ratio of 1,3-butadiene monomer to said members selected from the group consisting of liquid polymers and naphthenic oils in said monomer component solution is from 1:4 to 1:1.

31. A process as specified in claim 14, wherein the ratio of 1,3-butadiene to said liquid polymer in said monomer component solution is from 1:4 to 1:1.

32. A process as specified in claim 29, wherein the ratio of 1,3-butadiene monomer to said liquid polybutadiene in said monomer component solution is from 1:4 to 1:1.

* * * * *